United States Patent [19]
Crane, Jr. et al.

[11] Patent Number: 4,735,507
[45] Date of Patent: Apr. 5, 1988

[54] IMAGING COHERENT RADIOMETER

[75] Inventors: Robert Crane, Jr., Wilmington, N.C.; David S. Dunavan, Norwalk, Conn.

[73] Assignee: The Perkin-Elmer Corporation, Norwalk, Conn.

[21] Appl. No.: 884,694

[22] Filed: Jul. 11, 1986

[51] Int. Cl.[4] .................................................. G01B 9/02
[52] U.S. Cl. ...................................... 356/351; 356/352
[58] Field of Search ................. 356/346, 351, 352, 358

[56] References Cited

U.S. PATENT DOCUMENTS

| | | | |
|---|---|---|---|
| 3,582,212 | 6/1971 | Hesse | 356/352 |
| 3,612,691 | 10/1971 | Schwartz | 356/346 X |
| 3,694,088 | 9/1972 | Gallagher et al. | 356/351 |
| 3,717,404 | 2/1973 | Dandliker | 356/351 |
| 3,824,018 | 7/1974 | Crane, Jr. | 356/352 |
| 3,873,207 | 3/1975 | Bryngdahl | 356/351 |
| 4,147,424 | 4/1979 | Foster et al. | 356/346 X |
| 4,170,416 | 10/1979 | Fencil | 356/346 |
| 4,536,089 | 8/1985 | Siebert | 356/352 |
| 4,594,002 | 6/1986 | McNally | 356/346 |
| 4,595,292 | 6/1986 | Amodeo et al. | 356/346 |
| 4,600,307 | 7/1986 | Krohn et al. | 356/346 |

Primary Examiner—Davis L. Willis
Assistant Examiner—Matthew W. Koren
Attorney, Agent, or Firm—Thomas P. Murphy; Edwin T. Grimes; Francis L. Masselle

[57] ABSTRACT

An imaging coherent radiometer for detecting and determining the location and wavelength of coherent radiation or coherent lack of radiation in the presence of non-coherent ambient radiation. The apparatus includes an unequal path interferometer which divides incoming radiation containing coherent and non-coherent radiation into a first beam path and a second beam path through which a first beam and a second beam, respectively, travel. The optical path length difference between the first beam path and the second beam path are greater than the coherence length of the non-coherent radiation, but substantially less than the coherence length of the coherent radiation or coherent lack of radiation. Modulation means are provided to cause a predetermined difference in the optical frequencies between the first beam and the second beam proportional to a modulation signal. The first and second beams are then recombined into a recombined beam. Detecting means are provided to detect the interference of the first and second beams across the entire wavefront of the recombined beam, and over the entire image of the scene being viewed. Processing means detect and determine the location and wavelength of coherent radiation or coherent lack of radiation in the scene being viewed by the apparatus. This information can then be visually displayed. Additional processing means to respond to specific coherent wavelengths or wavelength sets.

36 Claims, 7 Drawing Sheets

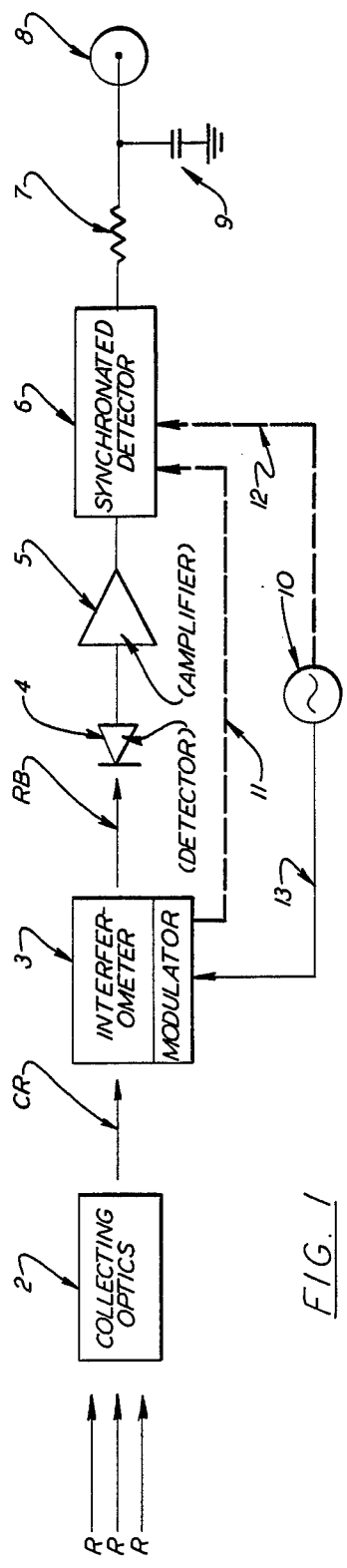
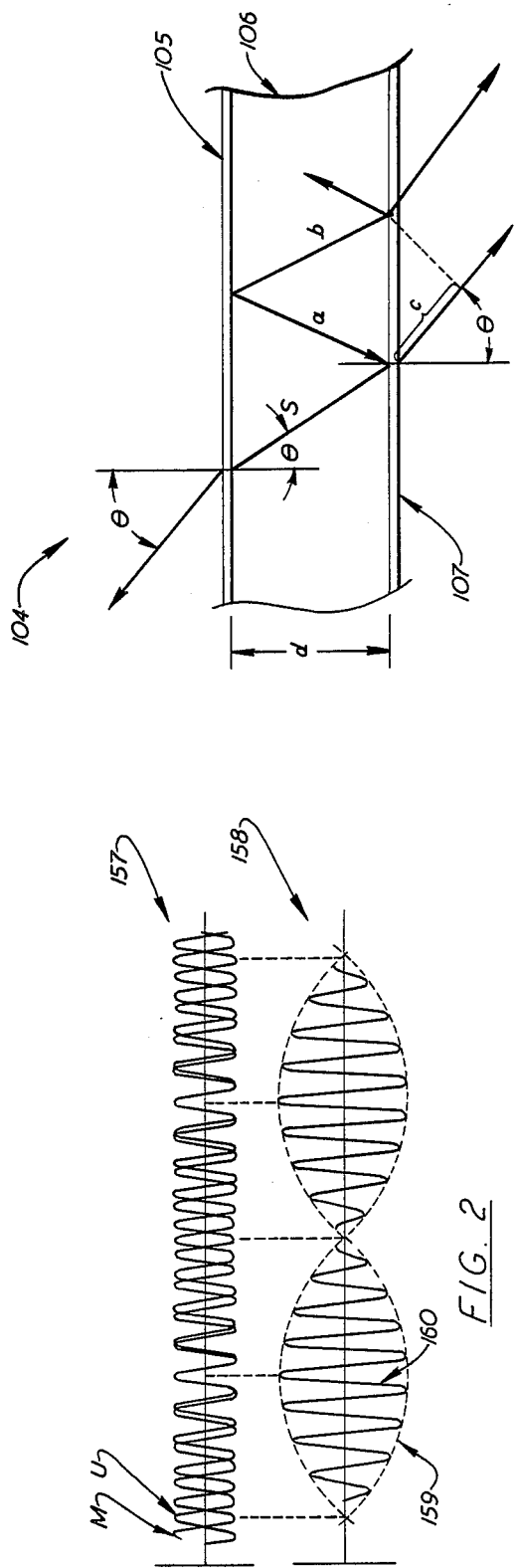

IMAGING COHERENT RADIOMETER

BACKGROUND OF THE INVENTION

The present invention relates to a device for detecting the presence of coherent radiation or the coherent lack of radiation in the presence of non-coherent background radiation. More particularly, the present invention relates to the use of an imaging optical radiometer to make such detections and determine the direction and wavelength of such radiation or such lack of radiation.

Imaging optical radiometers, constructed in accordance with the concept of this invention are adapted, among other possible uses for use in detecting and determining the wavelength of coherent radiation, or coherent absence of radiation. In addition, it is adapted to determine the direction of arrival of the source of the coherent radiation or coherent lack of radiation and indicate such position in a display of the field of view.

Such a device can find application in detecting specific gas clouds, oil and mineral exploration and detection through Fraunhofer line discrimination techniques and intelligence surveillance.

Conventional laser receivers use a narrow-band optical filter or diffraction gratings in combination with a photodetector, bandpass amplifier and thresholded peak detector to detect the presence of coherent radiation. This approach has two disadvantages: one, the laser wavelength must be known and two, the video bandwidth required to pass nanosecond pulses also passes a lot of detector and/or background photon noise. The coherent radiometer approach has a broad spectral response and a noise integration time limited only by the available observation time.

The prior art is evidenced by U.S. Pat. Nos. 3,824,018 to R. Crane Jr. and 4,309,108 to E. Seibert, both of which are assigned to the same assignee as the present application. The aforementioned patents disclose the use of Fabry-Perot etalon interferometers.

While the prior art devices detect presence, wavelength and direction of arrival of coherent radiation from a single source, our contribution is to do so for all coherent sources within a scene, resulting in an imaging coherent radiometer with longer integration times for sensitivity enhancement, to also do so for the coherent absence of radiation, and for other advantages which will become apparent as the description proceeds.

SUMMARY OF THE INVENTION

The present application is related to U.S. patent application Ser. No. 884,695, filed on July 11, 1986 entitled "Fabry-Perot Scanning and Nutating Imaging Coherent Radiometer" which is assigned to the same assignee as the present invention and filed on even date therewith.

The present invention contemplates the provision of a new and improved apparatus to detect the presence, wavelength and direction of arrival of coherent radiation or the coherent absence of radiation in the presence of non-coherent ambient radiation.

This apparatus takes the form of an imaging coherent radiometer which includes collecting optics to increase the radiation collection aperture and substantially collimate the incoming radiation. The collimated beam then enters an unequal path interferometer which divides incoming radiation, containing coherent and non-coherent radiation, into a first beam path and a second beam path through which a first beam and a second beam, respectively, travel. The optical path length difference (OPD) between the first beam path and the second beam path is greater than the coherence length of the non-coherent radiation, but less than the coherence length of the coherent radiation or coherent absence of radiation.

Modulation means in the first beam path modulates the optical frequency of the first beam. The first beam and the second beam then recombine after traversing their respective beam paths. Means are then provided to detect the interference between the first and second beams. The interference so detected is processed to determine the existence, direction and wavelength of coherent radiation or the coherent lack of radiation.

Generally, the modulation means increases or decreases the optical frequency of the first beam of radiation. When the first beam, now with an increased or decreased frequency, combines with the second beam a beat frequency is produced. This beat frequency is at the same frequency as the optical modulation frequency. With the OPD chosen as previously described, only the components of coherent radiation or coherent lack of radiation in the incoming radiation will interfere upon being recombined. Therefore, only these coherent components will produce a beat frequency which can be detected.

Following the modulation means are means for detecting the beat signals produced and means for generating signals which can later be visually or electronically interpreted for coherent radiation source detection, direction and/or wavelength.

The wavelength of the incoming coherent radiation can be determined by incorporating into the detecting means an axis crossing frequency counter to generate a numerical count inversely proportional to the input wavelength or period discrimination means to compare the period of the modulation signal to that of the modulator control waveform.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily be utilized as a basis for designing other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawings, forming a part of the specification.

BRIEF DESCRIPTION OF THE DRAWINGS

FIG. 1 is a block diagram of a coherent energy radiometer in accordance with the present invention;

FIG. 2 is a graphical representation of the reference and signal waveforms for the detector apparatus of FIG. 1;

FIG. 3 is a diagram illustrating the geometry of a Fabry-Perot etalon;

DETAILED DESCRIPTION OF THE INVENTION

Figure 4:
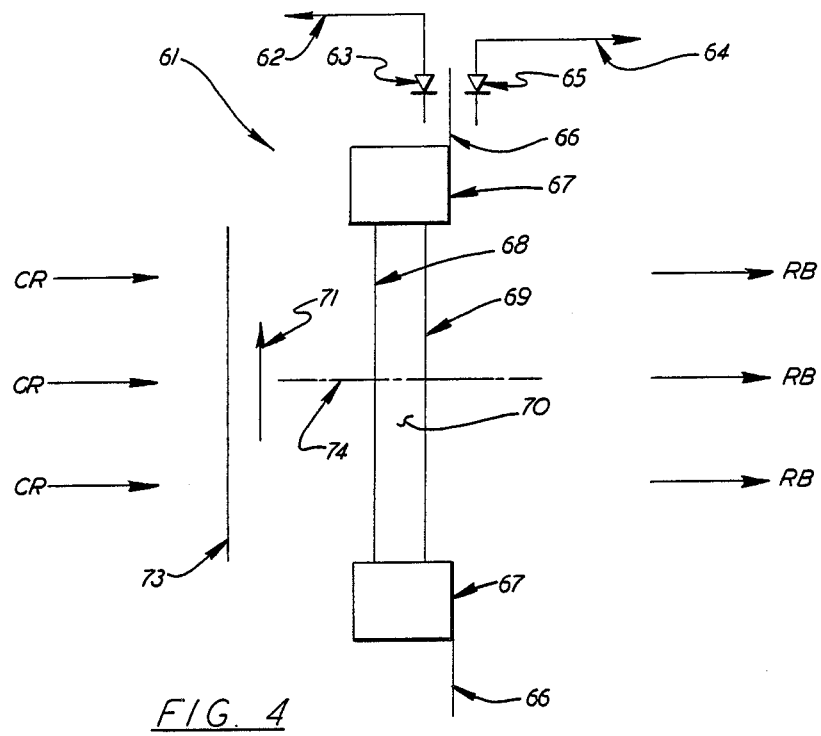
FIG. 4 is a diagram illustrating the geometry of a rotating birefringent Fabry-Perot etalon modulator.

FIG. 1 shows the basic components of a coherent radiometer. Collecting optics 2 serve to increase the radiation collection aperture and substantially collimate the incoming radiation. Collimated radiation, designated "CR", then enters into an interferometer/modulator 3.

It can be understood by those skilled in the art that the collecting optics 2 are only needed when the source of radiation is in the near field, i.e., within a few thousand feet of the coherent radiometer. When the source is at a distance large optics, such as a telescope, are required to increase the collecting aperture.

Interferometers may be categorized in a number of ways, three of which are method of beam separation, the optical path length difference (OPD) of the two beams, and interferometer symmetry. As used in this context the term symmetrical and asymmetrical refer to the number of beam reflections in the two optical paths of the interferometer. If both paths have either an even or odd number of reflections the interferometer is called symmetrical. If one path has an even number and one an odd number of reflections, the interferometer is called asymmetrical. The present invention utilizes only symmetrical interferometers.

The OPD of an interferometer used in the present invention is carefully chosen. Coherent radiation, such as that produced by laser light, may be characterized by its unique coherent properties: spatial, spectral, temporal and polarization. The temporal coherence property is described in terms of coherence length and is the property used in the present invention to distinguish coherent radiation from non-coherent radiation. This is because it is specific to laser radiation and unique relative to a natural background or foreground radiation in that laser radiation has a long coherence length relative to non-coherent radiation. In addition, the coherence length signature of laser radiation is not distorted by natural propagation effects. The interferometer OPD is selected so that it is longer than the coherence length of the incoherent background or foreground radiation and shorter than the coherence length of coherent radiation. The result is that the non-coherent radiation will be substantially unmodulated leaving only the coherent laser energy modulated at the interferometer output. As will later be shown modulation is accomplished by producing a linear change in the OPD of the interferometer proportional to a modulation signal carried by a line 13 from a modulation waveform generator 10. By changing the OPD in a linear manner, the coherent radiation that passes through the modulated leg of the interferometer will be at a different frequency than that which passes through the other leg. When the beams traversing the two legs are recombined the resulting waveform has a frequency equal to the average of the frequencies of the two beams. The amplitude of the recombined beam will vary in a cyclical manner at a frequency equal to the optical modulation frequency. This cyclical variation in amplitude is the "beat" signal which is indicative of the presence of coherent radiation or the coherent absence of radiation.

Referring to FIG. 2 this phenomenon is illustrated quite clearly. The top wave pattern 157 shows the two interfering optical waveforms. The modulated wave is shown as "M" and, due to frequency modulation, is at a slightly higher frequency than the unmodulated wave, designated as "U". The lower wave pattern 158 illustrates the result of combining waveform "M" with waveform "U". The resultant waveform 160 has a frequency which is the average of the frequency of waveform "M" and waveform "U". The amplitude varies in a cyclical manner which repeats with a frequency equal to the modulation frequency which is equal to the frequency of waveform "M", less the frequency of waveform "U". The frequency of this "beat" or varying amplitude shown for illustration by the envelope 159, is directly related to the modulation signal carried by line 13 from the modulation waveform generator 10 of FIG. 1.

Returning now to FIG. 1, the recombined beam, designated "RB", emanating from the interferometer/modulator 3 falls incident on the detector 4. An imaging lens, not shown, may be used to image the recombined beam, "RB", onto the detector 4 which is small so as to give high angular selectivity. Following the detector 4 is a conventional low-frequency amplifier 5 designed to pass the modulation signal generated at the detector 4 output and reject any spurious background frequencies from non-coherent radiation.

The synchronous detector 6 provides a signal indicative of whether or not there is coherent radiation in the incoming radiation 'R'. The synchronous detector 6 forms a product of the signal from the amplifier 5 times a reference waveform. As described hereinbelow, the reference waveform for the interferometer/modulators 3 shown in FIGS. 4 and 5 comes directly from the modulation waveform generator 10 through a line 12, shown as dashed, to the synchronous detector 6. The interferometer/modulators 3 shown in FIGS. 6, 7 and 8 generate a reference waveform which is carried by a line 11, shown as dashed, to the synchronous detector 6.

A conventional synchronous detector forms a product from two inputs, a signal $A \sin\omega(t+\delta)$ and a reference $B \sin\omega t$, where:

A and B=signal and reference amplitudes
$\delta$=unknown phase of signal relative to the reference
$\omega = 2\pi f$, where f=frequency
t=time $2\pi f\delta$ = phase difference, in radians, between signal and reference Conventionally B is made large compared to A; then the output is proportional to the unknown phase and A.

When the signal and reference are out of phase by $2\pi f\delta = \pi$ radians, then the product is zero and the signal would go undetected. To overcome this problem the synchronous detector 6 forms a second product:

signal × reference from A sin $\omega(t+\delta)$ × B cos $\omega t$

This product is large when the product of the sines equals zero. The output from the synchronous detector 6 is taken as the modulous, M, of the two or $$M = [(A\sin\omega(t+\delta) \times B\sin\omega t)^2 + (B\sin\omega(t+\delta) \times B\cos\omega t)^2]^{\frac{1}{2}}$$

where B is normalized to 1.0.

This function is the same as is performed in a Fourier analysis.

Following the synchronous detector 6 is a conventional integration network consisting of a resistor 7 and a capacitor 9 tied to ground. Because the synchronous detector 6 has a linear transfer characteristic, the integration network determines the overall receiver electronic noise bandwidth. Thus, very narrow noise bandwiths, on the order of $10^{-3}$ to 1.0 Hz, are attainable.

While the coherent radiometer just described was described with reference to coherent radiation it should be appreciated that it also has capability of detecting the coherent lack of radiation, determining its location in a given scene.

An example of the coherent lack of energy is an absorption line. Absorption, generally, is the removal of energy from radiation by the medium through which the radiation is passing. For a low or ambient pressure gas medium the absorption line is very narrow, as narrow as the coherent energy detectable by the apparatus herein described.

Interference may be made to occur between two beams of radiation containing this narrow band of missing radiation. Furthermore, the interference effects will mimic those of a narrow band of radiation with the same center frequency and same spectral width as the narrow band of missing radiation.

Absorption, or radiation subtraction, is a linear process as are beam interference, signal transformation at the detector and data processing. Combining the aforementioned steps yields a linear overall transfer function with one negative sign, that being for the step of radiation subtraction. In the case where coherent energy is being detected there is no radiation subtraction and the overall transfer function is positive.

The result is that the synchronous detector 6 of the coherent radiometer described hereinabove will give a positive output voltage at the output tap 8 when coherent radiation is present in the incoming radiation, "R", and a negative output voltage at the output tap 8 when a coherent lack of radiation is present in the incoming radiation, "R".

Several types of the interferometer/modulators hereinbelow described make use of Fabry-Perot etalons. Accordingly, the following discussion of the geometry and optical properties of a Fabry-Perot etalon is offered.

FIG. 3 illustrates the geometry of a Fabry-Perot interferometer or etalon. It comprises a spacer 106 with optically polished and exactly parallel sides. Each side has a partially reflecting surface 105 or 107 disposed upon it. It is well known that the spacer 106 can be replaced by an air gap whereupon the two partially reflecting surfaces 105 and 107 are disposed upon transparent substrates, not shown, held in spaced relation to one another. An incident wave has one component which is directly transmitted and another which is twice reflected. One component has a beam path length which is equal to s plus a plus b. The component has a second beam path with the length of s plus c. The optical path difference, OPD, through the etalon is:

$$OPD = (s + a + b) - (c + s) \qquad (1)$$
$$= (a + b) - c$$

This can easily be calculated from Snell's Law (Sin $\theta$ = n Sin $\theta'$) in light of the geometry of FIG. 3. It is found to be $$OPD = \frac{2nd}{\lambda} \cos\theta = \frac{2d}{\lambda}(n^2 - \sin^2\theta^{\frac{1}{2}}) \qquad (2)$$

where
n = index of refraction of spacer
d = thickness of spacer
$\theta$ = angle of incidence of incoming radiation with etalon
$\lambda$ = wavelength When the reflectivity of the partially reflecting surfaces 105, 107 is high, there are many multiple reflected wavelets contributing to the transmitted wave and the etalon is said to have high finesse. High finesse etalons are used for very narrow band spectral filters because of their narrow transmission characteristics as a function of wavelength. On the other hand, when reflectivity is moderate, the etalon is said to have low finesse. This type of etalon is best suited for coherent radiation detection.

Thus it can be seen from equation 2 that the variation of n, d and/or $\theta$ results in OPD variations.

FIG. 4 shows one type of interferometer/modulator which can be used in the present invention. It is a well known phenomenon that birefringent materials cause a light beam to be split into two components, each of which travel at different velocities. In the present invention the birefringent material 70 has a fast and slow axes which are mutually perpendicular with an index of refraction of $n_1$ for one axis and $n_2$ for the other. The index of refraction varies in a linear fashion between these two axes.

By coating each side of the birefringent material 70 with a reflective coating 68 and 69 a birefringent Fabry-Perot etalon is formed. The Fabry-Perot etalon structure is held in housing 67 and rotated about axis 74 by a motor, not shown.

The motor rotates the birefringent Fabry-Perot etalon at a preselected rotational velocity in response to a signal from the modulation waveform generator 10 of FIG. 1.

As the housing 67 rotates the annular plate 66, which extends radially from the housing 67, also rotates. The annular plate 66 has evenly placed radial slits, not shown, circumferentially spaced which allow light from an LED 63 to pass through them to the detector 65. The detector 65 thus generates a signal which is proportional to the rotational velocity of the birefringent Fabry-Perot etalon 61. This signal is the reference signal and is carried by line 11 to the synchronous detector 6 of FIG. 1.

As was previously shown the OPD is dependent upon the index of refractions of the spacer in a Fabry-Perot etalon. That is, as the index of refraction changes, so too does the OPD.

The form of interferometer/modulator shown in FIG. 4 calls for the thickness of the birefringent material 70 to be chosen such that $$OPD = \frac{\lambda}{2} = (n_2 - n_1)t \tag{5}$$

Where
 $\lambda$ = wavelength of incoming radiation
 $n_2$ = index of refraction of the fast axis of the birefringent material
 $n_1$ = index of refraction of the slow axis of the birefringent material
 $t$ = thickness of the birefringent material Thus, choosing the proper etalon thickness t of a birefringent material 70 with known indexes of refraction, $n_1$, and $n_2$, gives a change in OPD of the Fabry-Perot etalon 61 when the etalon 61 is rotated from the fast axis to the slow axis.

With this in mind the operation of the interferometer/modulator of FIG. 4 can now be described.

Collimated radiation from the collecting optics hereinbefore described incident on reflective surface 68, shown in both FIGS. 1 and 4 as "CR", first passes through a fixed plane polarizer to cause the incoming radiation to be plane polarized in the direction shown by the vertical arrow 71. By polarizing the incident light in one direction only, that component only will be transmitted through the etalon.

Thus, as the axis associated with the $n_1$ index of refraction is vertical the OPD will be different than when the axis associated with the $n_2$ index of refraction is vertical. This difference is $\lambda/2$ as shown in equation (5).

It can be seen, therefore, that the OPD cycles through a changes of 0 to $\lambda/2$ to 0 twice for each rotation of the birefringent Fabry-Perot etalon since the two axes, $n_1$ and $n_2$, are orthogonal.

Cycling the etalon in this manner modulates the transmitted beam by $\lambda/2$ and the internally reflected beam by $3\lambda/2$, with an equivalent OPD between the two beams of exactly one wavelength for an optical input at the design center wavelength. The modulation will be slightly different than one wavelength at other input wavelengths.

Figure 8:
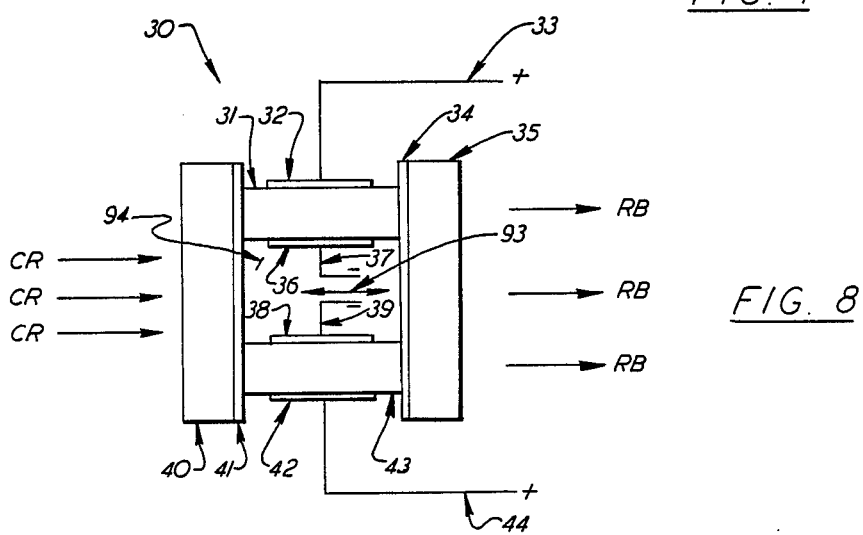
FIG. 8 is a diagram illustrating the geometry of a modulator incorporating a Fabry-Perot etalon interferometer with a vibrating reflector.

This modulation of the reflected wave causes a cyclical phase shift of the transmitted wave with respect to the reflected wave in the etalon. Such a time varying phase shift is mathematically and functionally equivalent to a constant frequency difference between the two optical beams. Accordingly, the two beams recombine to form a complex waveform as shown in FIG. 8 at 160. The amplitude, as described by the envelope 159, will go through two cycles for each revolution of the etalon. This "beat" frequency can then be detected by a detector 4 as shown in FIG. 1 and described in reference thereto.

Figure 5:
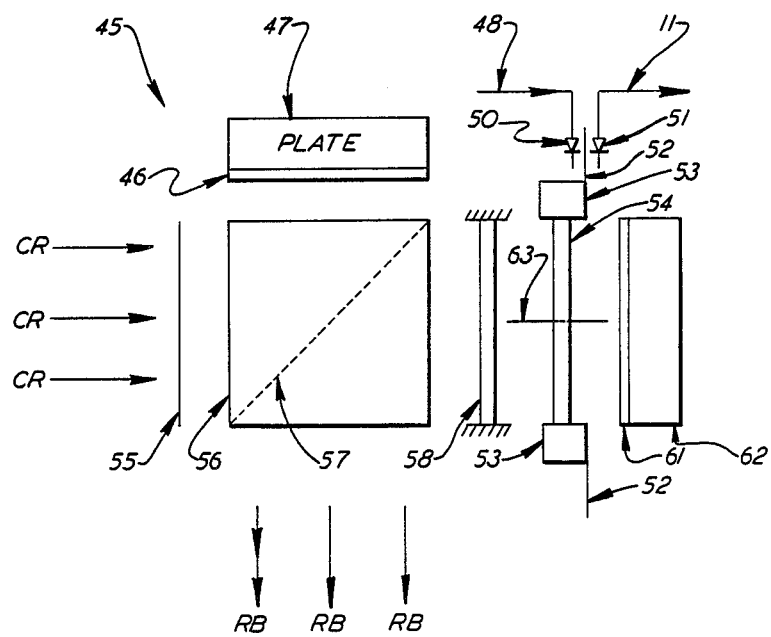
FIG. 5 is a diagram illustrating the geometry of a modulator incorporating a Michelson interferometer with an optical frequency shifter in one arm.

Another form of the interferometer/modulator 3 of FIG. 1 is shown in FIG. 5.

The incoming collimated radiation, designated here and in FIG. 1 as "CR", is incident on a fixed plane polarizer 55. This fixed plane polarizer 55 polarizes the collimated radiation, "CR", in any orientation.

This plane polarized light then enters a beam splitter 56 wherein the beam is split into two perpendicular legs by a beam splitter 57. One leg is directed towards a substrate 47 which has a reflective surface 46 disposed on its surface. This causes the beam to reflect. The beam in the other leg is modulated in a manner to be explained below by passing the beam through a fixed quarterwave plate 58 then through a rotating quarterwave plate 54 towards a substrate 62 where it is reflected by the reflecting surface 61 disposed on substrate 62.

The rotation of the quarterwave plate 54 in FIG. 5 is accomplished by holding it in housing 53 which is in turn rotated by a motor, not shown, around an axis 63. The motor rotates the housing 53 at a preselected rotational velocity in response to a signal from the modulation waveform generator 10 of FIG. 1. As the housing 53 rotates, the annular plate 52, which extends radially from the housing 53, also rotates. The annular plate 52 has evenly placed radial slits, not shown, circumferentially spaced which allow light from an LED 50 to pass through to the detector 51. The detector 51 generates a signal proportional to the rotational velocity of the quarterwave plate 54. This signal becomes the reference signal carried by a line 11 to the synchronous detector 6 of FIG. 1.

As an aid to the description of the modulation technique of FIG. 5 which follows, it will help to visualize a circularly polarized beam of radiation. Such a beam can be thought of at any instant of time as a series of vectors along the axis of propagation, pointing normal to the axis of propagation, with the angle of rotation increasing linearly as a function of distance or time. Alternatively, a beam of circularly polarized light can be thought of at a fixed plane as a vector rotating about the axis of propagation at an optical frequency $\nu_1$.

As the light, plane polarized with an optical frequency $\nu_1$, by polarizing means 55, is passed through a fixed quarterwave plate 58 it is circularly polarized. This beam, in turn, passes through a quarterwave plate rotating with or counter to the direction of rotation of the circularly polarized beam at a frequency $\pm f$ and reflected by a reflecting surface 61 back through the rotating quarterwave plate. Thus the beam passes through the quarterwave plate twice for the equivalent of $\lambda/2$ birefringence. The $\lambda/2$ birefringence goes from 0 to $\lambda/2$ to 0 per rotation cycle. This results in a circularly polarized beam with an optical frequency of $\nu_2$, equal to $\nu_1 \pm 2f$. Passing this beam back through the fixed quarterwave plate yields a plane polarized beam of frequency $\nu_1 \pm 2f$. Thus, the optical frequency has been changed by a small but precise amount, 2f, through the mechanical rotation of an optical element.

An unmodulated beam is reflected by reflector 46. The optical path from beamsplitter 57 to reflector 46 and back to beamsplitter 57 is adjusted to be slightly different than the optical path from beamsplitter 57 to reflector 61 in the modulator and back to beamsplitter 57. This difference is the interferometer OPD and may be adjusted as desired to discriminate coherent radiation or coherent absence of radiation from non-coherent background radiation.

When this modulated beam is recombined with the unmodulated beam, which has been reflected by reflective surface 46, a recombined beam is formed. This recombined beam is designated "RB" in both FIGS. 1 and 5. One of the beams is at the original frequency of $\nu_1$ the other is at a higher or lower frequency $\nu_1 + 2f$ or $\nu_1 - 2f$. The resultant complex waveform will be as shown at 160 in FIG. 2. The frequency of the amplitude variations can be determined, in a manner previously described, as 2f. Thus, two beats are produced for each rotation of the quarterwave plate. This beat is then detected by the detector 4 shown in FIG. 1 and processed in the manner previously described in reference thereto.

Figure 6:
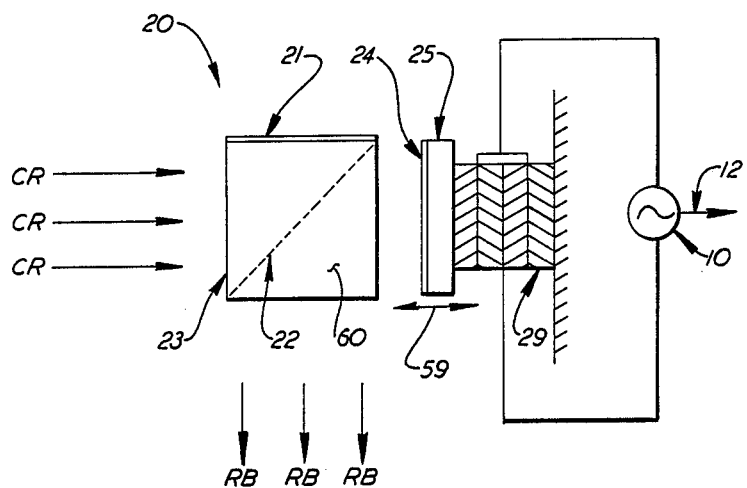
FIG. 6 is a diagram illustrating the geometry of a modulator incorporating a Michelson interferometer with a vibrating end mirror.

Another form of the interferometer/modulator 3 of FIG. 1 is as shown in FIG. 6.

FIG. 6 shows a Michelson type interferometer wherein one leg is modulated by cycling the reflective surface 24 from the modulation waveform generator 10 in the manner indicated by the arrow 59.

Describing the operation of the interferometer/modulator of FIG. 6 it can be seen that incoming collimated radiation, designated here and in FIG. 1 as "CR", enters the beamsplitter cube 23 and is split into two beams by a beamsplitter 22.

One beam is directed upward to a reflecting surface 21 this beam is reflected and emerges from the interferometer cube 60 in the direction of the recombined beam designated "RB".

The second beam is transmitted through the beamsplitter 22 and emerges from the interferometer cube 60 in the direction of a substrate 25. The substrate 25 is coated with a reflecting surface 24. It is the linear movement 59 of the substrate 25 and its reflecting surface 24 which causes modulation of the radiation in the manner described below.

The modulation waveform generator 10 provides a signal which causes a piezoelectric stack 29 to move axially in a linear fashion as shown by the arrow 59. The piezoelectric stack 29 is attached to the substrate 25. Hence, when the modulation waveform generator 10 is operating the substrate 25 and its attached reflecting surface 24 move axially in a linear fashion as shown by the arrow 59.

The reflector 24 is translated linearly along the optical axis by exactly $l = n \times \lambda/2$ where n is a whole number and is the response band center wavelength. If simple detection and direction are required, then n=1.0. If wavelength is also needed then n>1.0. The wavelength processing required is described hereinbelow in reference to FIG. 8.

As in the manner described in reference to interferometer/modulator of FIG. 4 the linear change in OPD causes a concomitant linear phase shift of the modulated beam with respect to the unmodulated beam. Such a linear varying phase shift is mathematically and functionally equivalent to a constant frequency change. Accordingly the two recombined beams form a complex waveform as shown at 160 in FIG. 2 which is detected at the detector 4 of FIG. 1 and processed in a manner described in reference thereto.

Figure 7:
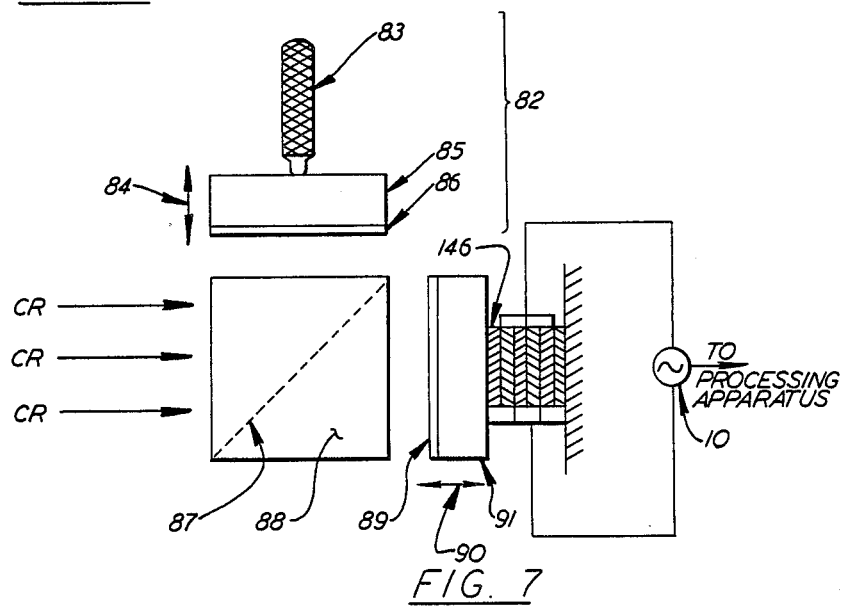
FIG. 7 is a diagram illustrating the geometry of a modulator consisting of a Michelson interferometer with one adjustable end mirror and an axially scanned end mirror.

FIG. 7 shows a modulator interferometer as in FIG. 6. The interferometer in FIG. 7, however, has an adjustable reference leg in that the fixed reflecting surface 21 in FIG. 6 has been replaced by an adjustable reflecting surface assembly 82.

The adjustable reflecting surface assembly 82 consists of a substrate 85 upon which a reflecting surface 86 is attached. An adjusting screw 83 is constructed so as to move the reflecting surface 86 in the direction shown by the arrow 84. This adjustment provides coherence selectivity thus allowing the interferometer to be tuned to a specific frequency bandwidth.

This coherence selectivity adjustment is best thought of by considering the implications of finite coherence length.

Coherence length is inversely proportional to spectral width and is defined as the product of the speed of light and the time over which the frequency of a beam of radiation remains essentially constant.

If the OPD is greater than the coherence length then one beam of light that traverses one path of an unequal path interferometer will not cause a detectable interference pattern with the beam of light that traverses the other path. Accordingly, by moving the reflecting surface 86 in a direction which increases the difference between the beamsplitter 87 to reflector 86 and the beamsplitter 87 to reflector 89, then the OPD is increased. This allows increasingly longer coherence lengths to be selected before interference is detectable.

Another form of the interferometer/modulator 3 of FIG. 1 is as shown in FIG. 8.

The interferometer/modulator of FIG. 8 acts as a Fabry-Perot etalon with an adjustable gap 94. It consists of a gap 94 between two surfaces 34 and 41 which have been optically polished, are exactly parallel and have been rendered partially reflecting. These surfaces have been coated onto substrates, 35 and 40 respectively, which are transparent to the collimated radiation, "CR".

Since a relatively low finesse etalon is desired, surfaces 34 and 41 are preferably between about 40 and 60 percent reflecting.

The OPD for two parallel rays, one of which passes directly through the Fabry-Perot etalon and the other of which is once reflected by both surfaces as to emerge along the same line as the first ray is as given in equation (2):

$$OPD = \frac{2\,nd}{\lambda} \cos \theta$$

where
 $\theta$ = angle of incidence in air
 n = index of refraction of spacer (e.g. air)
 d = spacer thickness
 $\lambda$ = wavelength Modulation of the coherent energy is accomplished by increasing or decreasing OPD, or, as can be seen from the above equation, increasing or decreasing the spacing, 'd', between the two surfaces 34 and 41.

Increasing or decreasing the spacer thickness is accomplished by placing piezoelectric devices 31 and 43 between the reflecting surfaces 34 and 41. Piezoelectric devices 31 and 43 can be either independent piezoelectric elements or cross-sections of a single piezoelectric cylinder. Alternatively increasing and decreasing the piezoelectric cylinders 31 and 43 causes the reflective surfaces to move relative to one another in a linear fashion as shown by the arrow 93. This linear motion of the piezoelectric cylinders 31 and 43 is driven by a single generator, not shown, and applied through positive lines 33 and 44 to electrodes 32 and 42 on the piezoelectric cylinders 31 and 43 and through negative lines 37 and 39 to electrodes 36 and 38 on the piezoelectric cylinders 31 and 43.

If the excursions as shown by the arrow 93 of the piezoelectric cylinders are controlled such that the airgap thickness, 'd', changes by $\pm\lambda/4$ then the OPD will changes a factor twice that or $\pm\lambda/2$.

As in the manner described in reference to the interferometer/modulator of FIG. 6 this OPD change of $\pm\lambda/2$ causes cyclical interference patterns to occur in the recombined beam, "RB", when coherent radiation is present in the incoming radiation. These cyclical interference patterns produce beats which are detected at the detector 4 of FIG. 1 and processed in a manner described in reference thereto.

Two alternate techniques can be used in the present invention to measure wavelength. These techniques described hereinbelow in reference to FIGS. 9 and 10, perform optimally when the OPD change is greater than $\pm 1.0$.

Figure 9:
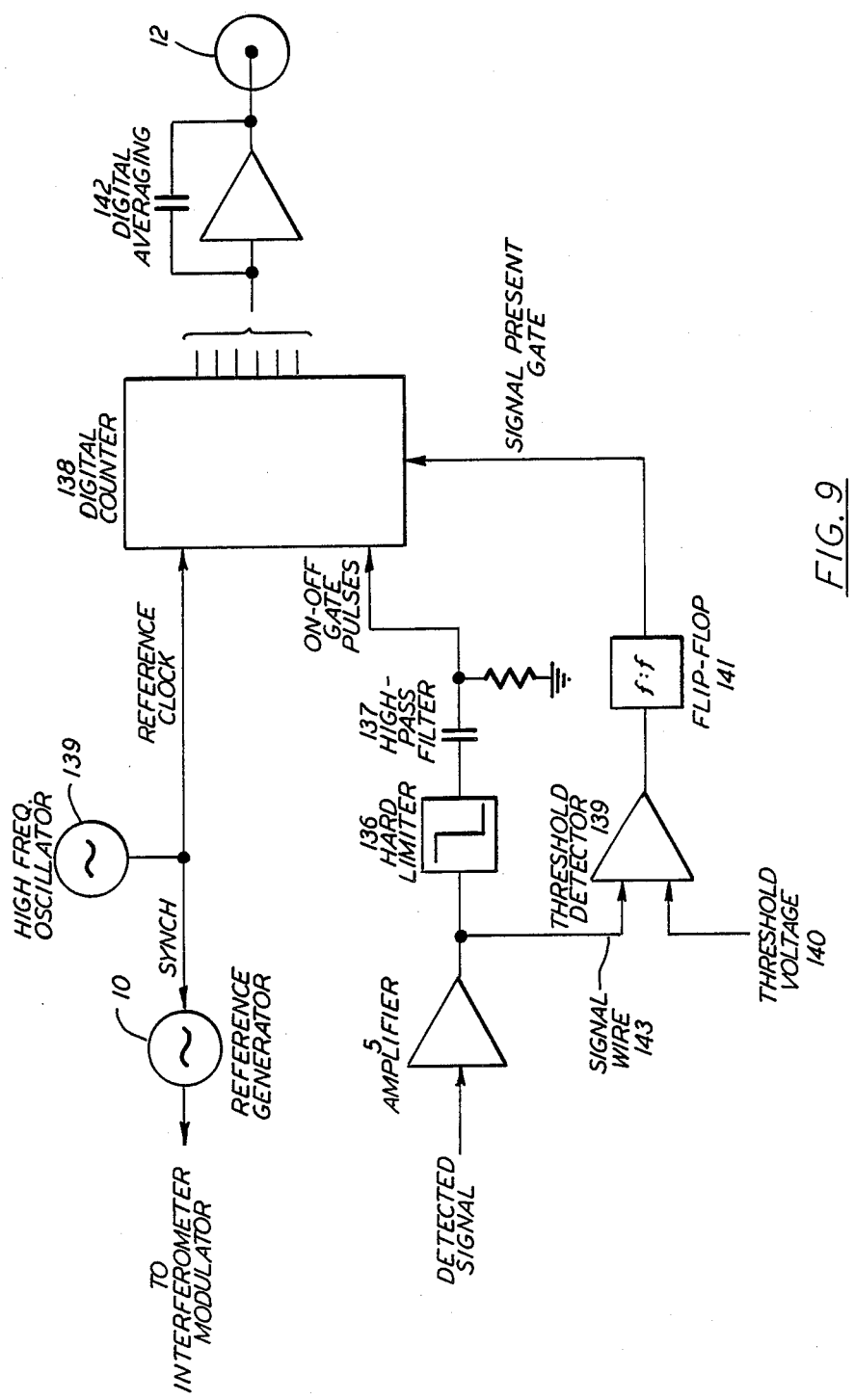
FIG. 9 shows an axis-crossing period counter adapted for use in the coherent energy radiometer of FIG. 1.

One such technique is an axis-crossing period counter, shown in FIG. 9. Briefly, the axis-crossing period counter determines the average half period of the signal and is used when isolated or single signals are to be detected. The underlying philosophy is that a shorter wavelength of coherent radiation gives a detected signal at a higher frequency and shorter half period. All half periods detected are averaged to give the best signal-to-noise ratio and most accurate measurement. The period counter 95a yield numerical count inversely proportional to wavelength of coherent radiation at the output tap 12. The instrument precision of the period counter will be determined by:

$$d\lambda \leq \frac{25}{n} \%$$

where:
  $d\lambda$ = instrument precision in %
  n = total number of wavelengths in the interferometer OPD change due to modulation per excursion in one direction The measurement uncertainty due to signal-to-noise ration will be:

$$\sigma_\lambda = \frac{100}{S/N} \%$$

where:
  $\sigma_\lambda$ = rms uncertainty in % of wavelength
  S/N = signal-to-noise ratio in rms/rms The actual operation of the period counter of FIG. 9 proceeds as follows. A high-frequency reference oscillator 139 generates a reference clock. The modulator reference generator 10 is synchronized with this clock. The reference clock also feeds a digital counter 138. The detected signal is amplified, by the amplifier 5 of FIG. 1, and fed to a hard limiter 136. This generates a square wave at the signal frequency. A high-pass filter 137 converts the square wave into a series of spikes, one for each axis crossing of the original detected signal. These spike pulses are fed to the digital counter 138 where they serve as "on" and "off"-gate pulses. Thus the digital counter counts the clock pulses only during a half period of the signal. Both positive and negative half periods are counted. A digital averaging circuit 142, shown symbolically in FIG. 9, forms an average of all half periods counted. In order to minimize spurious counts a signal-present gate is formed from the amplified signal by a threshold detector 139 followed by a flip-flop circuit 141. The signal-present gate turns on the digital counter only when the detected and amplified signal exceeds a preset threshold 140, set at something like three to four times the rms noise on the signal wire 143. The output of the period counter, at output tap 12, is a digital word showing average clock-counts per signal half period which is representative of the wavelength of the incoming coherent radiation.

Figure 10:
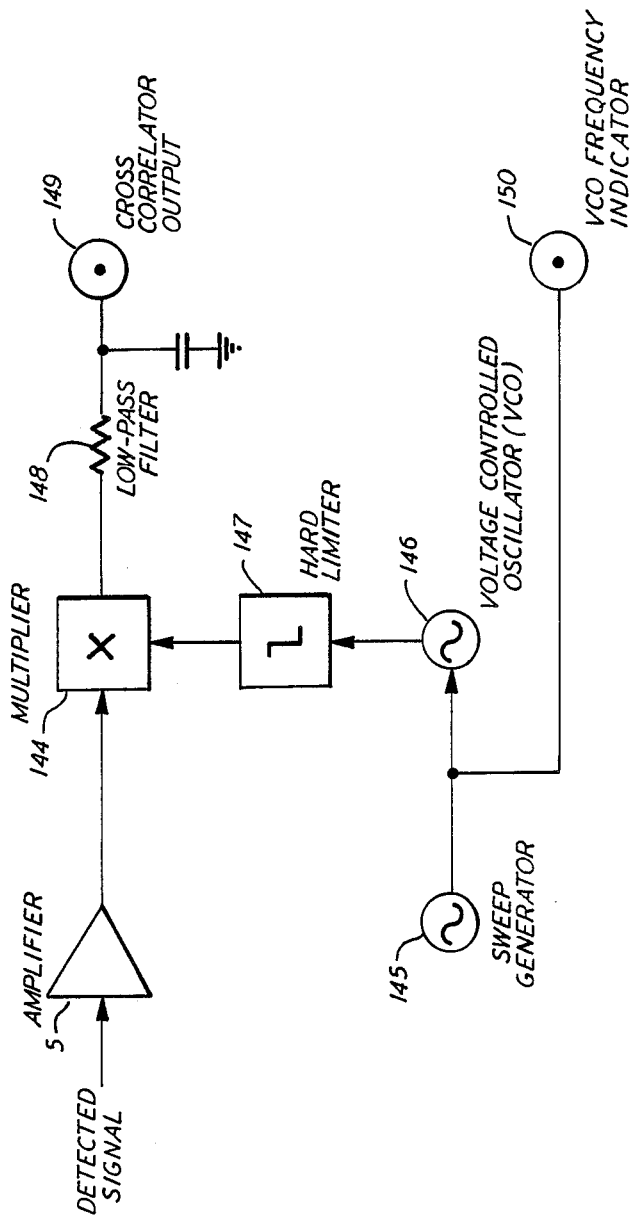
FIG. 10 shows a cross-correlator adapted for use in the coherent energy radiometer of FIG. 1.

A second technique for measuring wavelength is a cross correlator as shown in FIG. 10. In this technique the unknown frequency of the detected signal is compared to the known frequency of a voltage-controlled oscillator, VCO. When the two are the same an analog voltage appears at the correlator output 149. The VCO frequency at that time is indicated by the sweep voltage at output terminal 150. The instrument precision and measurement uncertainty are given by the same two equations given hereinabove in reference to the axis-crossing period counter of FIG. 9.

The actual operation of the cross correlator proceeds as follows. The detected signal is amplified by the amplifier 5 of FIG. 1 as shown in FIG. 10 and fed to one input of a multiplier circuit 144. A sweep generator 145 generates a slow saw-tooth sweep voltage. The sweep voltage controls the frequency of a voltage controlled oscillator 146, VCO. The VCO 146 is adjusted to sweep the frequency of its output over a range covering all possible detected-signal frequencies. The VCO output is converted into a square wave by a hard limiter 147 and fed to the second input terminal of the multiplier 144. The multiplier 144 forms the product $$A(\sin 2\pi f_s t) \times (1.0 \sin 2\pi f_{vco} t)$$

where:
  A = detected signal amplitude
  $f_s$ = detected signal frequency
  $f_{vco}$ = voltage controlled oscillator frequency When $f_s = f_{vco}$ this product is maximum compared to all other conditions. A low-pass filter 148 smooths out the signal frequencies and passes the sweep frequency and its harmonics sufficient to indicate the presence of good correlation between $f_s$ and $f_{vco}$. This correlator circuit is shown symbolically to indicate the functions required for its operation. In actual use two things would be implemented in addition to what has been shown: (1) digital circuitry would be used for the multiplier 144 and (2) the actual detected signal would be recorded or digitized and stored in memory for the duration of a signal intercept as indicated by a signal-present threshold detector such as was shown in FIG. 9.

It should be noted that when detecting a set of narrow-band emission or absorption coherent lines the detected waveform will not necessarily be a sine wave. This fact can be used to advantage with a cross-correlator type processor, as shown in FIG. 10, to enhance its specificity by using a reference signal waveform computed to match that generated by the emission or absorption line set.

Figure 11:
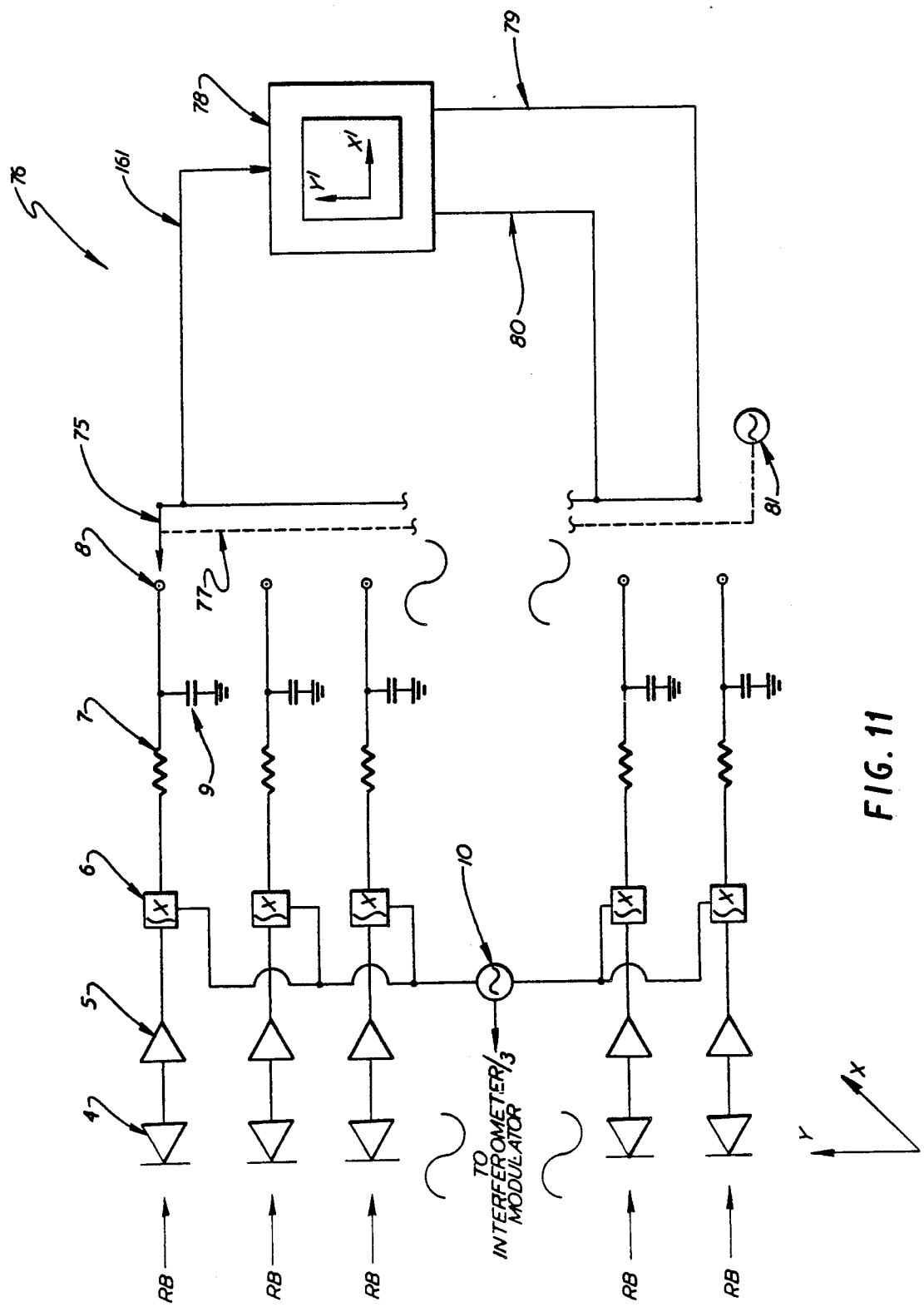
FIG. 11 is a schematic illustration of an imaging coherent radiometer constructed in accordance with the concepts of this invention as shown in FIG. 1.

FIG. 11 shows, schematically, an imaging coherent radiometer incorporating the apparatus as shown in FIG. 1.

The interference wavefront of the recombined beam from a single interferometer/modulator designated "RB", is imaged at detector 4. A plurality of detectors are shown in the y direction. In addition, detectors, not shown, extend in the x direction so as to form an x-y detector matrix.

Each of the detectors 4 has an associated amplifier 5, a synchronous detector 6, an integrating network 7 and an output tap 8, each of which operates in the manner described in reference to FIG. 1. One input to each of the synchronous detectors 6 comes from the modulation waveform generator 10.

It should be noted that there is not necessarily a 1:1 relationship between the frequency of the detcted signal and the frequency of the modulatin waveform generator 10. In some cases, such as the modulator in FIG. 4, there will be a 4:1 difference. In other cases, when the modulator displacement is set to other than ±λ/2, there will be a different frequency ratio. In all cases these are design factors which can be accommodated in the signal processing circuitry.

The uncertainty in input wavelength results in an uncertainty in the beat signal phase. Therefore, as described hereinabove in reference to FIG. 1, synchronous detector 6 performs the products of [sin (ref)]×[beat signal]and [cos (ref)]×[beat signal]beat signal to accommodate all possible phase angles.

An array of detectors sample intensities over the x-y matrix in the imaged interference wavefront. As previously discussed the existence of a beat signal at the detector 4 indicates the presence of coherent radiation or coherent lack of radiation at a corresponding point in the scene. If coherent energy exists the voltage at the output tap 8 will be some positive value and if a coherent lack of energy is detected the voltage at the output tap 8 will be some negative value.

A raster scanning video display system is shown generally at 76. The raster arm 75 moves sequentially from one output tap 8 to another in the x-direction, not shown, then repeats the process after moving to the next row in the y-direction. This movement is controlled by the raster generator 81 which is operatively connected to the raster arm or 5 by control means shown as a dashed line 77.

As the raster arm samples a particular output tap 8 its position in the x-y matrix is fed to the video monitor 78 through lines 79 and 80 for the x-direction and the y-direction respectively. The signal from the output tap 8, indicating the presence of coherent radiation or the coherent absence of radiation, is also fed to the video monitor 78 through line 161 where it is applied to the monitor intensity control for video display purposes.

Each point on the x-y matrix, represented by the x-y matrix of output tap 8, has a corresponding point on the x'-y' matrix of the video monitor 78. Thus, the video monitor displays the position of coherent energy or coherent lack of energy for any given scene being viewed by the imaging coherent radiometer. The distinction between coherent radiation and coherent lack of radiation can be made clear on the video display by the proper processing of the signal passing through line 161. Such processing can be performed by a processor, not shown, integral with the video monitor 78. Coherent energy can be represented, for example, by one color while the coherent lack of radiation is another.

Figure 12:
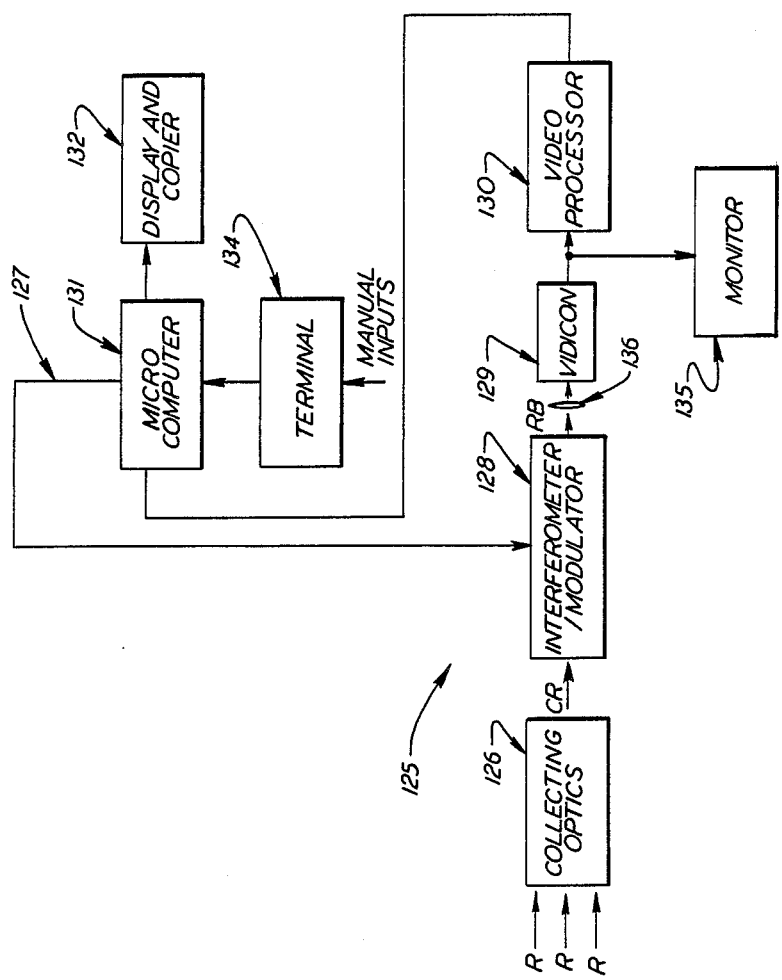
FIG. 12 is a schematic illustration of an imaging coherent radiometer utilizing a vidicon detector, computer analysis and video display output.

FIG. 12 shows in block diagram form a video imaging coherent radiometer using the interferometer/modulators described previously with reference to FIGS. 4, 5, 6, and 8. Instead of the detector 4 as shown in FIGS. 1 and 9, and associated electronics, the video imaging radiometer uses a vidicon 129 and associated electronics to produce a video display 132 of interference data as described hereinabove.

Incoming radiation, designated "R", is collected and collimated by suitable collecting optics 126. This collimated radiation, designated "CR", enters an interferometer/modulator 128 where, in response to a signal 127 from the micro computer 131, the radiation in one beam of the interferometer is modulated in a manner like that described in reference to FIGS. 4, 5, 6 or 8. The two beams in the interferometer/modulators 128 are then recombined forming a recombined beam, designated "RB". The recombined beam, "RB", exhibits interference characteristics identical to those described in reference to the recombined beams "RB" of FIGS. 4, 5, 6 and 8. A lens 136 then forms an image of the scene being viewed on the target surface of the vidicon tube 129. The interference characteristics in "RB" are then sensed by the vidicon tube 129.

This technique of sensing interference patterns and the associated processing is best considered in reference to P. R. Yoder, Jr., R. P. Grosso, R. Crane, "Use of Phase Measuring Interferometry in Quantity Production of High Quality Optics", *SPIE* Vol. 330—Optical Systems Engineering II, p 84 (1982), and references cited therein.

Briefly, the technique can be described as follows:

The interference pattern from the interferometer/modulator is imaged onto a vidicon's photoconductor, not shown. This "raw" image is then scanned, in the vidicon, by an electron beam, not shown, and displayed on a monitor 135 so that the interference pattern can be adjusted and the image centered and magnified to properly fill the vidicon photoconductor field.

A video processor 130 acts as an analog to digital converter which converts the analog signals from the vidicon 129 to digital signals for the micro computer 131.

The micro computer 131 performs several functions. It sends a signal via line 127 to the interferometer/modulator 128 to cause the OPD to vary in a linear fashion. It also interprets (by means of a Fourier analysis alorithm) the signals from the video processor 130 and outputs the results to a display and copier 132 for video output or hard copy of the interference patterns or "contour maps" indicating direction of coherent radiation or coherent lack of radiation in a scanned scene. The terminal 134 allows for manual input of commands to the micro computer 131.

It should be noted that detection of the interference pattern can be accomplished by a solid state diode array, as is known in the art, in place of the vidicon tube 129.

Having thus described the invention with particular reference to the preferred forms thereof, it will be obvious to those skilled in the art to which the invention pertains, after understanding the invention, that various changes and modifications may be made therein without departing from the spirit and scope of the invention, as defined by the claims appended hereto.

What is claimed is:

1. An imaging radiometer for detecting and determining location and wavelength of coherent radiation, or coherent absence of radiation, in the presence of non-coherent ambient radiation which comprises, in combination:

an unequal path symmetrical interferometer which divides incoming radiation containing coherent and non-coherent radiation into a first beam and a second beam;

the optical path length difference between the path length traversed through said unequal path symmetrical interferometer by the first beam and the path length traversed through said unequal path symmetrical interferometer by the second beam being substantially greater than the coherence length of the non-coherent radiation, but substantially less than the coherence length of the coherent radiation or coherent absence of radiation;

modulation means to cause a predetermined difference in the optical frequencies between the first beam and the second beam proportional to a reference waveform;

means for forming a recombined beam, which recombined beam consists of the first beam and the second beam after having traversed said unequal path interferometer;

detecting means;

imaging means to image the scene being viewed onto said detecting means;

said detecting means detecting the interference of the first beam with the second beam across the entire wavefront of the recombined beam;

first processing means for processing the interference detected to detect and determine direction of coherent radiation or the coherent absence of radiation; and second processing means to determine the wavelength or wavelength set of coherent radiation or coherent absence of radiation in a scene being viewed.

2. An apparatus as claimed in claim 1 wherein said modulation means comprises:

fixed plane polarizing means substantially in the optical path of the incoming energy;

a rotating birefringent element disposed in the optical path of the incoming radiation following said fixed plane polarizing means, the two sides of said rotating birefringent element being substantially perpendicular to the optical path of the incoming radiation, substantially parallel to one another and substantially flat;

partially reflecting surfaces disposed on said two sides of said rotating birefringent element; and means to provide said modulation signal proportional to the rotational velocity of said birefringent element.

3. An apparatus as claimed in claim 1 wherein said modulation means comprises:

a fixed plane polarizer to plane polarize the incoming radiation;

a fixed quarterwave plate oriented to circularly polarize the first beam;

means to change by a predetermined amount the optical frequency of the circularly polarized beam; and means to plane polarize the frequency modulated circularly polarized beam.

4. An apparatus as claimed in claim 3 wherein said means to change by a predetermined amount the optical frequency of the circularly polarized beam comprises:

a rotating quarterwave plate disposed substantially in the axis of the circularly polarized beam; and a reflector to cause the frequency modulated circularly polarized beam to pass back through said rotating quarterwave plate; and means to provide said modulation signal proportional to the rotational velocity of said rotating quarterwave plate.

5. An apparatus as claimed in claim 3 wherein said means to modulate the optical frequency of the circularly polarized beam comprises:

a rotating half-wave plate disposed substantially in the axis of the circularly polarized beam; and means to provide said modulation signal proportional to the rotational velocity of said rotating half-wave plate.

6. An apparatus as claimed in claim 3 wherein said means to modulate the optical frequency of the circularly polarized beam comprises:

two quarterwave plates, rotating at the same frequency and each disposed substantially in the optical path of the circularly polarized beam; and means to provide said modulation signal proportional to the rotational velocity of said two quarterwave plates.

7. An apparatus as claimed in claim 3 wherein said means to plane polarize the frequency modulated circularly polarized beam comprises:

a quarterwave plate disposed in substantially the optical axis of the frequency modulated circularly polarized beam.

8. An apparatus as claimed in claim 3 which further comprises:

adjustment means to increase or decrease the optical path of the second beam.

9. An apparatus as claimed in claim 8 wherein said adjustment means comprises:

a substrate which has a first side which is substantially flat and substantially perpendicular to the optical path of the second beam;

a reflective surface disposed on said first side of said substrate; and means to move said substrate along the optical path of the second beam to increase or decrease the optical path of the second beam.

10. An apparatus as claimed in claim 1 wherein said modulation means comprises:

a reflective surface disposed substantially in the optical axis of the first beam and substantially perpendicular to the optical axis of the first beam; and means to linearly alter the length of the first beam path in a cyclic manner.

11. An apparatus as claimed in claim 10 wherein said means to cyclically alter the length of the first beam path comprises:

means to translate said reflective surface in a cyclical fashion and in a direction parallel to the optical axis of the first beam to the extent of $\pm\lambda/4$.

12. An apparatus as claimed in claim 11 wherein said means to translate said reflective surface in a cyclical fashion comprises:

a signal generator to provide said modulation signal;

a piezoelectric stack connected at one end thereof to the side of said reflective surface opposite the first beam; and said signal generator applying said modulation signal to said piezoelectric stack to alternately expand and contract said piezoelectric stack causing said reflective surface to cyclically translate along the optical axis of the first beam to the extent of $\pm\lambda/4$.

13. An apparatus as claimed in claim 10 which further comprises:

adjustment means to increase or decrease the optical path of the second beam.

14. An apparatus as claimed in claim 13 wherein said adjustment means comprises:

a substrate which has a first side which is substantially flat and substantially perpendicular to the optical path of the second beam;

a reflective surface disposed on said first side of said substrate; and means to move said substrate along the optical path of the second beam to increase or decrease the optical path of the second beam.

15. An apparatus as claimed in claim 1 wherein said modulation means comprises:
a Fabry-Perot etalon including two substantially transparent plates in spatial relation to one another and a partially reflecting surface disposed upon one surface of each of the said two plates; and
means to oscillate the distance between the said two plates to the extent of $\pm\lambda/4$.

16. An apparatus as claimed in claim 15 wherein said means to oscillate the distance between the said two plates includes:
a signal generator to provide said modulation signal;
one or more piezoelectric cylinders attachedly disposed between the said two plates holding the said two plates substantially in parallel spatial relation to one another;
said signal generator applying said modulation signal to said one or more piezoelectric cylinders causing them to alternately expand and contract further causing the said two plates to cyclically translate with respect to one another to the extent of $\pm\lambda/4$.

17. An apparatus as claimed in claim 1 wherein said detecting means includes:
plurality of detectors arranged substantially in one plane in a matrix, said one plane being normal to the wavefront of the recombined beam.

18. An apparatus as claimed in claim 17 wherein the said first processing means includes, for each detector in the matrix:
a low frequency amplifier for each detector in the matrix to amplify the detector signal from each detector in the matrix;
a synchronous detector for each detector in the matrix to form a product of the reference waveform and the amplified detector signal;
an integration network for each synchronous detector in the matrix; and
an output tap for each detector channel in the matrix to indicate the presence or absence of coherent radiation or the coherent lack of radiation in the incoming radiation, the position of each output tap corresponding to a position in the scene being viewed.

19. An apparatus as claimed in claim 1 wherein said detecting means includes a single detector.

20. An apparatus as claimed in claim 19 wherein said first processing means includes:
a low frequency amplifier to amplify the detector signal;
a synchronous detector to form a product of the reference waveform and the amplified detector signal;
an integration network; and
an output tap to indicate the presence or absence of coherent radiation or the coherent lack of radiation in the incoming radiation.

21. An apparatus as claimed in claim 1 wherein said detecting means includes a vidicon tube which produces an analog interference signal proportional to the interference of the first beam with the second beam.

22. An apparatus as claimed in claim 21 wherein said first processing means includes:
a video amplifier to amplify the said analog interference signal from the said vidicon;
a frame grabber to convert said analog video interference signal to a digital video interference signal and to store the digital video signals in an X-channel by Y-channel data file where the number of X-channels corresponds to the number of image pixels in the X direction and the number of Y-channels corresponds to the number of image pixels in the Y direction; and
digital computing means to compare the digital interference signal for each pixel channel in the X by Y data file with internally generated signal to detect the presence or absence of coherent radiation or coherent lack of radiation in the incoming radiation and its position in the scene being viewed.

23. An apparatus as claimed in claim 1 wherein said second processing means comprises an axis-crossing period counter.

24. An apparatus as claimed in claim 1 wherein said second processing means comprises a cross-correlator.

25. An imaging radiometer for detecting and determining location and wavelength of coherent radiation, or coherent absence of radiation, in the presence of non-coherent ambient radiation which comprises, in combination:
an unequal path interferometer which divides incoming radiation containing coherent and non-coherent radiation into a first beam and a second beam path;
the optical path length difference between the path length traversed through said unequal path interferometer by the first beam and the path length traversed through said unequal path interferometer by the second beam being substantially greater than the coherence length of the non-coherent radiation, but substantially less than the coherence length of the coherent radiation or coherent absence of radiation;
fixed plane polarizing means substantially in the optical path of the incoming energy;
a rotating birefringent element disposed in the optical path of the incoming radiation following said fixed plane polarizing means, the two sides of said rotating birefringent element being substantially perpendicular to the optical path of the incoming radiation, substantially parallel to one another and substantially flat;
partially reflecting surfaces disposed on said two sides of said rotating birefringent element; and
means to provide a reference waveform proportional to the rotational velocity of said birefringent element;
means for forming a recombined beam, which recombined beam consists of the first beam and the second beam after having traversed said unequal path interferometer;
detecting means;
imaging means to image the scene being viewed onto said detecting means;
said detecting means detecting the interference of the first beam with the second beam across the entire wavefront of the recombined beam;
first processing means for processing the interference detected to detect and determine direction of coherent radiation or the coherent absence of radiation; and
second processing means to determine the wavelength or wavelength set of coherent radiation or coherent absence of radiation in a scene being viewed.

26. An imaging radiometer for detecting and determining location and wavelength of coherent radiation, or coherent absence of radiation, in the presence of non-coherent ambient radiation which comprises, in combination:

an unequal path interferometer which divides incoming radiation containing coherent and non-coherent radiation into a first beam and a second beam path;

the optical path length difference between the path length traversed through said unequal path interferometer by the first beam and the path length traversed through said unequal path interferometer by the second beam being substantially greater than the coherence length of the non-coherent radiation, but substantially less than the coherence length of the coherent radiation or coherent absence of radiation;

a fixed plane polarizer to plane polarize the incoming radiation;

a fixed quarterwave plate to circularly polarize the first beam;

a rotating quarterwave plate disposed substantially in the axis of the circularly polarized beam; and a reflector to cause the frequency modulated circularly polarized beam to pass back through said rotating quarterwave plate; and means to provide a refence waveform proportional to the rotational velocity of said rotating quarterwave plate;

a quarterwave plate disposed in substantially the optical axis of the frequency modulated circularly polarized beam;

means for forming a recombined beam, which recombined beam consists of the first beam and the second beam after having traversed said unequal path interferometer;

detecting means;

imaging means to image the scene being viewed onto said detecting means;

said detecting means detecting the interference of the first beam with the second beam across the entire wavefront of the recombined beam;

first processing means for processing the interference detected to detect and determine direction of coherent radiation or the coherent absence of radiation; and second processing means to determine the wavelength or wavelength set of coherent radiation or coherent absence of radiation in a scene being viewed.

27. An apparatus as claimed in claim 26 wherein said means to modulate the optical frequency of the circularly polarized beam comprises:

a rotating half-wave plate disposed substantially in the axis of the circularly polarized beam; and means to provide said modulation signal proportional to the rotational velocity of said rotating half-wave plate.

28. An apparatus as claimed in claim 26 wherein said means to modulate the optical frequency of the circularly polarized beam comprises:

two quarterwave plates, rotating at the same frequency and each disposed substantially in the optical path of the circularly polarized beam; and means to provide said modulation signal proportional to the rotational velocity of said two quarterwave plates.

29. An imaging radiometer for detecting and determining location and wavelength of coherent radiation, or coherent absence of radiation, in the presence of non-coherent ambient radiation which comprises, in combination:

an unequal path interferometer which divides incoming radiation containing coherent and non-coherent radiation into a first beam and a second beam path;

the optical path length difference between the path length traversed through said unequal path interferometer by the first beam and the path length traversed through said unequal path interferometer by the second beam being substantially greater than the coherence length of the non-coherent radiation, but substantially less than the coherence length of the coherent radiation or coherent absence of radiation;

a reflective surface disposed substantially in the optical axis of the first beam and substantially perpendicular to the optical axis of the first beam; and a signal generator to provide a reference waveform;

a piezoelectric stack connected at one end thereof to the side of said reflective surcvace opposite the first beam;

said signal generator applying said reference waveform to said piezoelectric stack to alternately expand and contract said piezoelectric stack causing said reflective surface to cyclically translate along the optical axis of the first beam to the extent of $\pm \lambda/4$ means for forming a recombined beam, which recombined beam consists of the first beam and the second beam after having traversed said unequal path interferometer;

detecting means;

imaging means to image the scene being viewed onto said detecting means;

said detecting means detecting the interference of the first beam with the second beam across the entire wavefront of the recombined beam;

first processing means for processing the interference detected to detect and determine direction of coherent radiation or the coherent absence of radiation; and second processing means to determine the wavelength or wavelength set of coherent radiation or coherent absence of radiation in a scene being viewed.

30. An imaging radiometer for detecting and determining location and wavelength of coherent radiation, or coherent absence of radiation, in the presence of non-coherent ambient radiation which comprises, in combination:

an unequal path interferometer which divides incoming radiation containing coherent and non-coherent radiation into a first beam and a second beam path;

the optical path length difference between the path length traversed through said unequal path interferometer by the first beam and the path length traversed through said unequal path interferometer by the second beam being substantially greater than the coherence length of the non-coherent radiation, but substantially less than the coherence length of the coherent radiation or coherent absence of radiation;

a Fabry-Perot etalon including two substantially transparent plates in spatial relation to one another and a partially rflecting surface disposed upon one surface of each of the said two plates; and a signal generator to provide a reference waveform;

one or more piezoelectric cylinders attachedly disposed between the said two plates holding the said two plates substantially in parallel spatial relation to one another;

said signal generator applying said reference waveform to said piezoelectric stack to alternately expand and contract said piezoelectric stack causing said reflective surface to cyclically translate along the optical axis of the first beam to the extent of $\pm\lambda/4$ means for forming a recombined beam, which recombined beam consists of the first beam and the second beam after having traversed said unequal path interferometer;

detecting means;

imaging means to image the scene being viewed onto said detecting means;

said detecting means detecting the interference of the first beam with the second beam across the entire wavefront of the recombined beam;

first processing means for processing the interference detected to detect and determine direction of coherent radiation or the coherent absence of radiation; and second processing means to determine the wavelength or wavelength set of coherent radiation or coherent absence of radiation in a scene being viewed.

31. A coherent energy modulator which comprises:

an unequal path symmetrical interferometer which divides incoming radiation containing coherent and non-coherent radiation into a first beam path and a second beam path through which a first beam and a second beam, respectively, travel and then recombine;

the optical path length difference between the first beam path and the second beam path being substantially greater than the coherence length of the non-coherent radiation, but substantially less than the coherence length of the coherent radiation;

fixed plane polarizing means substantially in the optical path of the incoming energy;

a rotating birefringent element disposed in said first beam path following said fixed plane polarizing means, the two sides of said rotating birefringent element being substantially perpendicular to the optical path of the incoming radiation, substantially parallel to one another and substantially flat;

partially reflecting surfaces disposed on said two sides of said rotating birefringent element; and means to detect the rotational frequency of said birefringent element.

32. A coherent energy modulator which comprises:

an unequal path interferometer which divides incoming radiation containing coherent and incoherent radiation into a first beam path and a second beam path through which a first beam and a second beam, respectively, travel and then recombine;

the optical path length difference between the first beam path and the second beam path being substantially greater than the coherence length of the incoherent radiation, but substantially less than the coherence length of the coherent radiation;

a fixed plane polarizer to plane polarize the incoming radiation;

a fixed quarterwave plate to circularly polarize the first beam;

means to modulate the optical frequency of the beam of circularly polarized light; and means to plane polarize the frequency modulated circularly polarized beam of light.

33. An apparatus as claimed in claim 32 wherein said means to modulate the optical frequency of the beam of circularly polarized light comprises:

a rotating quarterwave plate disposed substantially in the axis of the beam of circularly polarized light; and a retro-reflector to cause the beam of frequency modulated circularly polarized light to pass back through said rotating quarterwave plate.

34. An apparatus as claimed in claim 32 wherein said means to modulate the optical frequency of the beam of circularly polarized light comprises:

a rotating half-wave plate disposed substantially in the axis of the beam of circularly polarized light.

35. An apparatus as claimed in claim 32 wherein said means to modulate the optical frequency of the beam of circularly polarized light comprises:

two quarterwave plates, rotating at the same frequency and each disposed substantially in the optical path of the beam of circularly polarized light.

36. An apparatus as claimed in claim 32 wherein said means to plane polarize the frequency modulated beam of circularly polarized light beam comprises:

a quarterwave plate disposed in substantially the optical axis of the frequency modulated beam of circularly polarized light.

* * * * *